March 29, 1932.   J. K. MOHR   1,851,286
VENTILATOR
Filed May 25, 1927   2 Sheets-Sheet 1
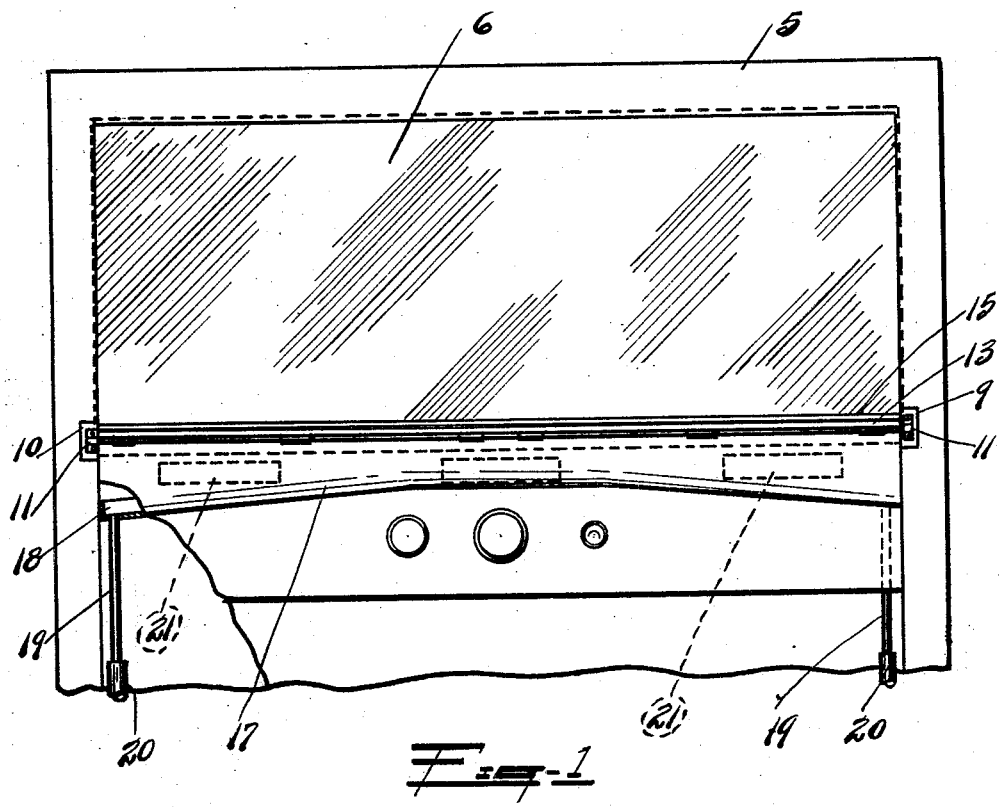
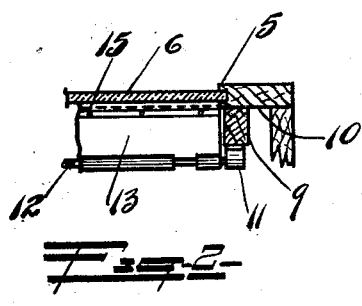
Inventor
John Kohler Mohr.
By Frank C. Farman
Attorney March 29, 1932. J. K. MOHR 1,851,286
VENTILATOR
Filed May 25, 1927 2 Sheets-Sheet 2

Inventor
John Kohler Mohr
By Frank C. Fearman
Attorney

Patented Mar. 29, 1932

1,851,286

UNITED STATES PATENT OFFICE

JOHN KOHLER MOHR, OF BAY CITY, MICHIGAN, ASSIGNOR TO ANNEMARIE MOHR, OF BAY CITY, MICHIGAN

VENTILATOR

Application filed May 25, 1927. Serial No. 193,962.

This invention relates to ventilators, and particularly to a ventilator for use on automotive vehicles.

The prime object of the invention is to provide a ventilator for use in connection with an automotive vehicle body, and by means of which direct or indirect ventilation may be provided.

Another object is to provide a vehicle body having an elongated slotted opening beneath the windshield, and provide a pivoted adjustable ventilator or panel or member adjacent thereto, said panel in one position forming a tight weatherproof closure for said opening; and in another position permitting a direct unobstructed air passage through said opening; and in still another position directing the incoming air currents downwardly, and back of the instrument board or panel if desired.

A further object is to design a ventilator panel of simple and economical construction; which can be readily applied and adjusted, and which in no manner interferes with the driver's vision or manipulation of the vehicle.

A still further object is to provide a ventilator panel for use on vehicles having a straight bottom windshield, which can be applied to vehicles in the process of construction, or to vehicles already in use.

The above and other objects will appear as the specification progresses, reference being had to the accompanying drawings in which I have shown the preferred embodiment of my invention, and in which like reference numerals indicate like parts throughout the several views thereof.

In the drawings.

Fig. 1 is a fragmentary elevation of the inside of a conventional vehicle body showing my adjustable ventilator panel in closed position.

Fig. 2 is a fragmentary transverse vertical sectional view through the windshield, and showing the ventilator panel in closed position, the dotted lines illustrating the position of the panel when adjusted for direct ventilation.

Figures 3, 4:
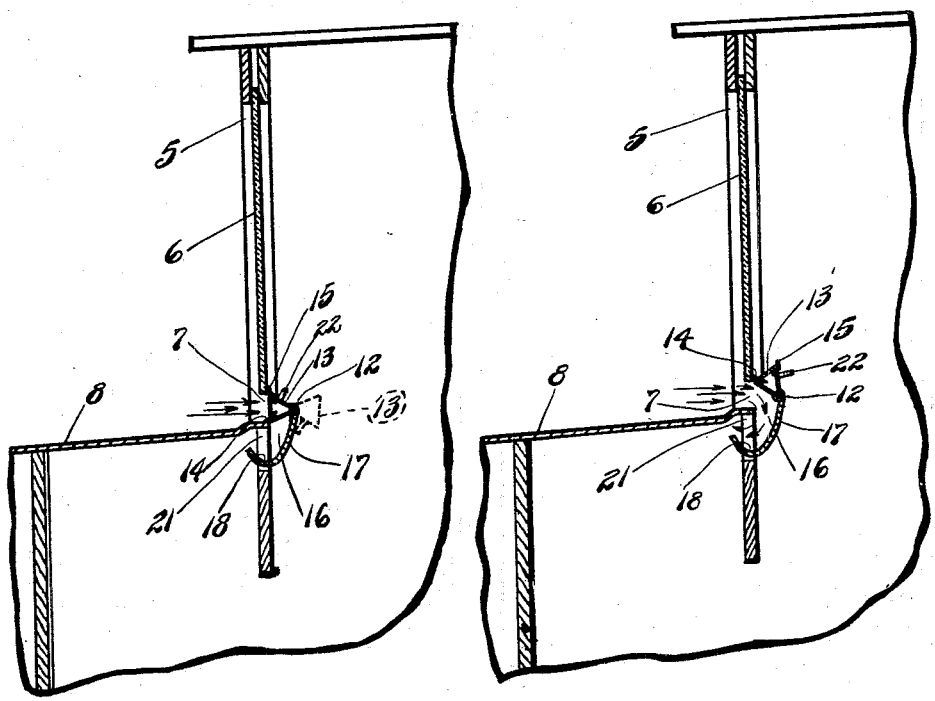
Fig. 3 is a view similar to Fig. 2, the panel being in position for indirect ventilaton, the path of the air currents being indicated by the numerous arrows.
Fig. 4 is an enlarged transverse sectional view through the panel member.
Figure 5:
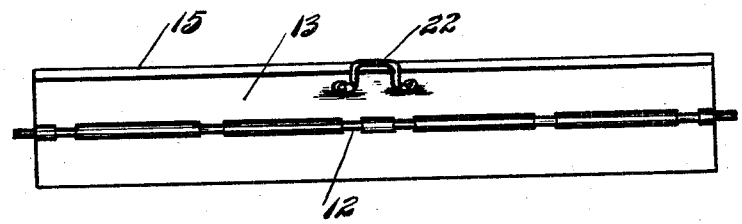
Fig. 5 is an enlarged fragmentary top plan view showing the manner of mounting the panel.
Figure 6:
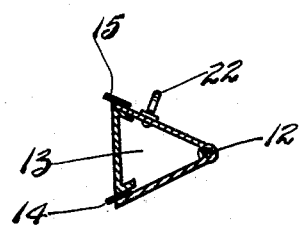
Fig. 6 is a detail view of the ventilator panel.

Referring now particularly to the drawings in which I have shown the preferred embodiment of my invention, the numeral 5 indicates the windshield of a conventional vehicle body in which a single glass panel 6 is mounted, this is set in the frame in the usual manner, and is stationary therein; this frame being of the usual construction excepting that the lower frame member is omitted, an elongated opening 7 being provided between the lower edge of the windshield, and the hood 8 of the body proper, and this opening is controlled in a manner to be presently described. Supports or brackets 9 are secured to the body corner posts 10, and small bearings 11 are mounted thereon in any approved manner, a rod 12 being journaled in said bearings, and a ventilator panel member 13 is mounted on said rod, and while in the present instance I have shown said panel as triangular in shape, it will be obvious that any other shape having a face of sufficient width to form a closure for the opening may be used if desired.

Spaced apart flexible rubber strips 14 and 15 respectively are secured to said ventilator panel in any approved manner, and when the ventilator is in position to form a closure for the opening 7, the edges of said strips engage the edges of the elongated opening and form a weatherproof joint thereat, the lower strip 14 engaging the lower edge of the opening, and the upper strip 15 engaging the lower edge of the windshield. When the ventilator is adusted for indirect ventilation as shown in Fig. 3 of the drawings, the lower strip 14 engages the lower edge of the windshield and forms a tight joint thereat, the air currents being directed downwardly as indicated by the numerous arrows in Fig. 3.

For directing the air currents downwardly when the ventilator is set for indirect ventilation, I provide a passage 16. This is formed by means of a preferable sheet metal shield 17 which I mount on the rod 12, securing the ends thereof to the body proper, the lower edge being curved and turned to form a trough 18 as clearly shown in Fig. 1 of the drawings, the ends being pitched downwardly from the center, a drain pipe 19 being connected to each end to drain water therefrom, the end of said pipe telescoping into a large pipe 20 which leads to the exterior of the body. Water is naturally admitted through the opening 7 when the ventilator is set for indirect ventilation, and the vehicle is being driven in the rain.

Spaced apart slotted openings 21 are provided in the instrument board to permit the air to flow behind it, or if desired, the air can flow straight downwardly, in which event the shield 17 need not be curved, merely having the turned lip which forms the trough.

The ventilator panel is manipulated by means of a handle 22 which is riveted to the panel in a position convenient to the driver, and is held in adjusted position by any suitable means (not shown).

From the foregoing description it will be obvious that I have perfected a very simple, convenient and economical ventilator panel by manipulation of which either direct, or indirect ventilations may be provided.

What I claim is:—

1. A vehicle body provided with a rigid stationary windshield having an elongated opening between the lower edge of the windshield glass and the body, of a ventilating panel comprising a triangular shaped body pivotally mounted on said body at a point spaced inwardly from said opening so that when the ventilator is in closed position the outer edges engage the body and lower edge of the windshield glass respectively to form a weatherproof closure for said opening, and a combination shield spaced inwardly from said opening and projecting below said ventilator and forming a downwardly extending air passage, the lower edge of said shield being turned upwardly to also form a drain trough.

2. A vehicle body provided with a stationary windshield, an elongated opening directly below the lower edge of the windshield, a shield spaced inwardly from the windshield, a triangularly shaped ventilating panel pivotally mounted on the upper end of said shield the outer edges being adapted to engage the body and edge of the windshield respectively to form a weatherproof closure for said opening, and spaced apart flexible strips mounted on said panel to form a weatherproof joint with the top and bottom edges of said opening.

3. The combination with a vehicle body provided with a stationary windshield, an elongated opening directly below the windshield, of a shield spaced inwardly from said windshield, a triangularly shaped ventilating panel pivotally mounted on said shield and normally forming a closure for said opening, the outer edges of said panel engaging the body and lower edge of the windshield respectively when in closed position, flexible strips on said panel, and a downwardly extending conduit between the windshield and the pivoting point of said ventilating panel.

4. A vehicle body provided with a stationary windshield, an elongated opening directly below the windshield, a combination shield and drain-trough spaced inwardly from the windshield, a triangular shaped adjustable ventilator panel pivotally mounted on said shield and body at a point spaced inwardly from said windshield, said panel being adjustable so that the lower edge thereof engages the lower edge of the windshield to provide indirect ventilation, the lower edge of said shield being shaped to form a drain trough, which projects beneath the windshield opening, and drain pipes communicating with said trough.

In testimony whereof I hereunto affix my signature.

JOHN KOHLER MOHR.